United States Patent [19]

Soloway

[11] 4,194,620
[45] Mar. 25, 1980

[54] TROPICAL FISH TRAINING KIT

[76] Inventor: Natalie Soloway, 15200 Rayneta Dr., Sherman Oaks, Calif. 91403

[21] Appl. No.: 865,575

[22] Filed: Dec. 29, 1977

[51] Int. Cl.² .................... B65D 85/50; A01K 63/00
[52] U.S. Cl. ...................................... 206/223; 43/100; 119/5; 206/577; 273/271; 272/4
[58] Field of Search ................... 206/223, 577, 466; 119/5; 273/100, 271; 43/100; 350/140, 143

[56] References Cited

U.S. PATENT DOCUMENTS

| | | | |
|---|---|---|---|
| 943,343 | 12/1909 | Ericson | 273/100 |
| 2,465,812 | 3/1949 | Mohme | 43/100 |
| 2,690,698 | 10/1954 | Dasch | 350/140 |
| 3,079,959 | 3/1963 | Johnston | 350/143 |
| 3,140,534 | 7/1964 | Messina | 206/577 |
| 3,207,421 | 9/1965 | Hunger et al. | 206/466 |
| 3,819,184 | 6/1974 | McPhail et al. | 273/271 |
| 3,991,715 | 11/1976 | Gibson, Jr. | 119/5 |

Primary Examiner—William T. Dixson, Jr.
Attorney, Agent, or Firm—Thomas J. Greer, Jr.

[57] ABSTRACT

This disclosure relates to a tropical fish training kit which includes an elongated notched rod and a plurality of rings adapted to be adjustably positioned therealong through which a fish is trained to swim, a plurality of tubes adapted to be interconnected to form a maze through which fish swim, a housing including means defining two paths of travel having opposite entrance and exit openings and a movable gate bearing fish or like food holding means which attract fish and upon movement of the gate from its closed to an open position, the fish move from the entrance opening to the exit opening to simulate a horse race, and a sheet having means setting off a plurality of individual areas, such as a tic-tac-toe game, with fish or like food holding means within each area.

3 Claims, 6 Drawing Figures

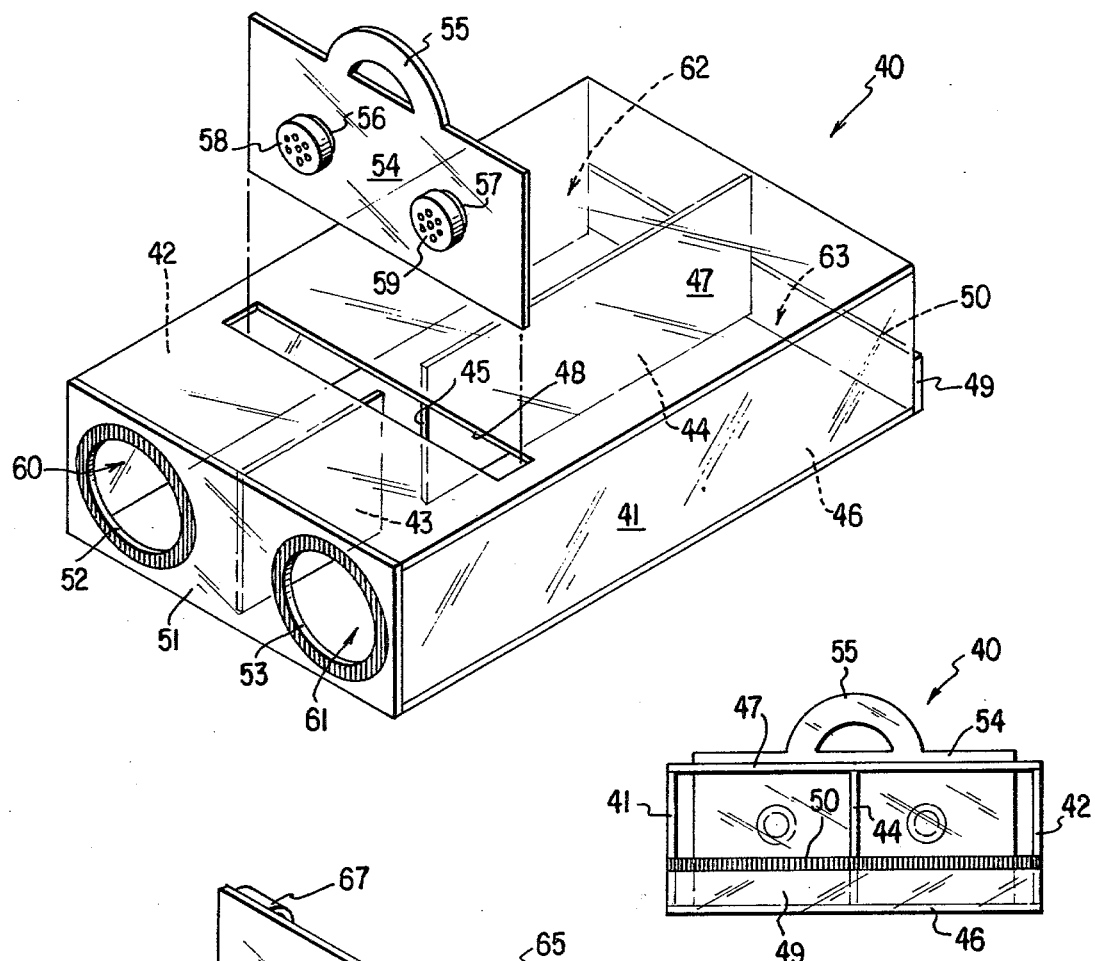
FIG. 4
FIG. 5
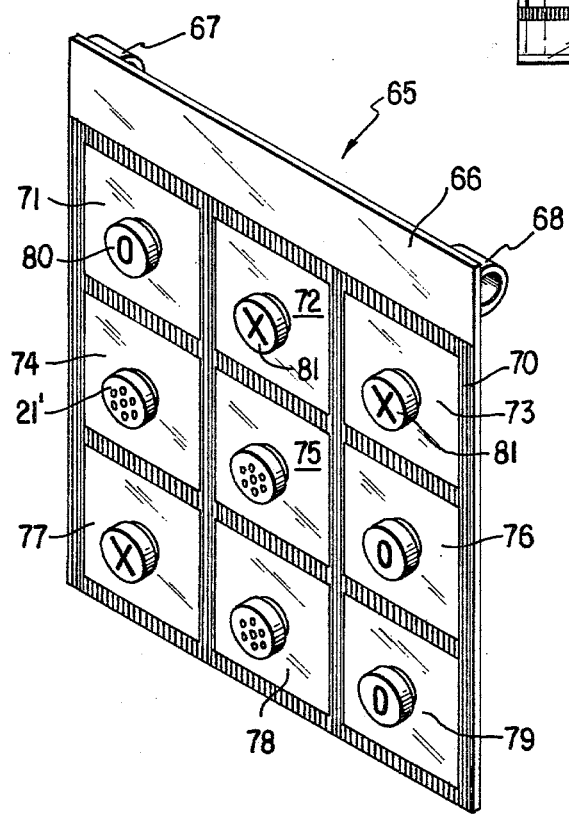
FIG. 6

TROPICAL FISH TRAINING KIT

This invention is directed to a kit for training and/or observing tropical fish, and includes as one component thereof an elongated notched rod adapted to be disposed contiguous to the surface of a body of water, such as a fish tank, and a plurality of rings carried by the rod through which a fish is adapted to swim, and the rings are preferably colored or otherwise provided with means visually distinguishable to a fish so that the same can see and thus swim through the ring or rings.

A main object of this invention is to provide a novel tropical fish or like training kit of the type described which further includes a plurality of interconnectable tubes forming a maze through which a fish will swim with each of the tubes having means at a first end portion visibly distinguishable to a fish for identifying and bounding an entrance opening into and along the maze.

Still another object of this invention is to provide a novel tropical fish training kit of the type heretofore described including a device for a simulated horse race game in which a housing is provided with at least two openings through which fish may swim toward a gate having means thereon for holding fish or like food, the gate normally closing an entrance opening of two paths of travel leading toward exit openings of the housing, and upon movement of the gate to an open position the fish swim from the entrance opening to the exit opening much in the character of a simulated horse race game.

Still another object of this invention is to provide a tropical fish training kit which additionaly includes a device for playing tic-tac-toe through the use of a sheet having means setting off a plurality of individual areas, and means within each of the areas for holding fish or like food to attract fish thereto.

With the above and other objects in view that will hereinafter appear, the nature of the invention will be more clearly understood by reference to the following detailed description, the appended claims and the several views illustrated in the accompanying drawings.

IN THE DRAWINGS

FIG. 4 is a perspective view of another device of the kit, and illustrates a housing having a pair of entrance openings through which fish swim into individual chambers and a gate carrying fish or like food holding means which can be moved to an open position to permit fish to swim along confined paths of travel toward an exit opening of the housing much in the manner of a simulated horse race.

FIG. 5 is an end or rear view of the housing of FIG. 4 and illustrates exit openings of the housing.

FIG. 6 is a perspective view of another device of the fish kit, and illustrates a board having means setting off a plurality of individual areas with means within each area for holding fish or like food to attract fish thereto.

Figure 1:
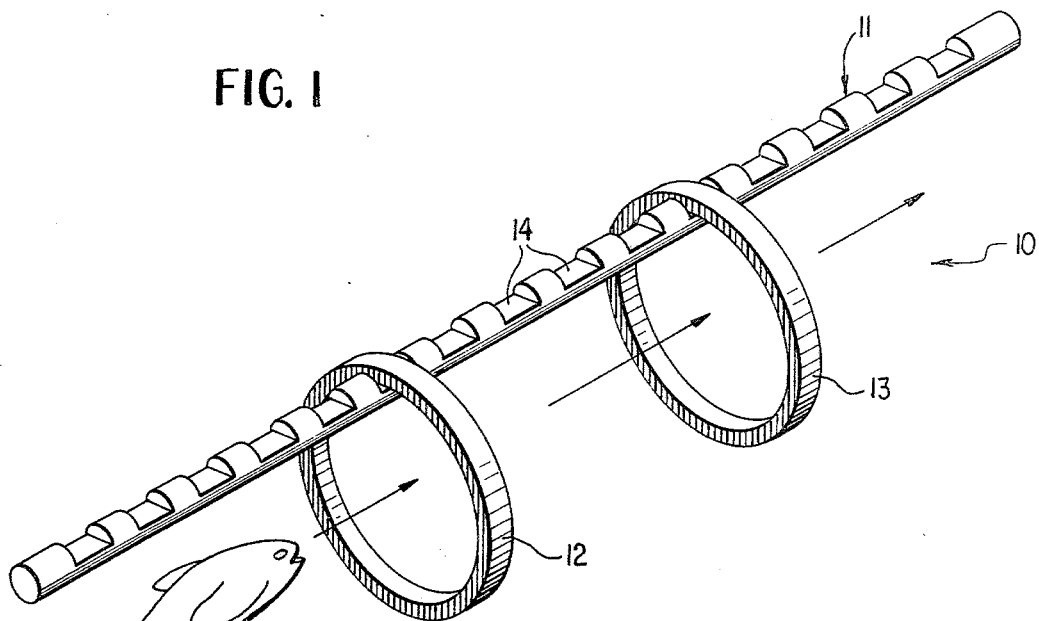
FIG. 1 is a perspective view of a training device of the tropical fish training kit of this invention and illustrates a notched rod holding a pair of rings through which fish are adapted to swim.

A novel tropical fish or like training kit (unnumbered) is made up of the various devices of FIGS. 1 through 6 and one of these includes a device 10 for training fish defined by an elongated rod 11 and one or more rings 12, 13. The rod 11 and the rings 12, 13 are preferably constructed from plastic material and the rings 12, 13 are also preferably colored (red, for example) or otherwise provided with means which render the rings visible to a fish F or the like. Though only two rings 12, 13 are illustrated, it is to be understood that initially a single ring 12 or 13 may be utilized in the training procedure and additional rings (not shown) may be associated with the rod 11. The rod 11 also includes a plurality of notches 14 which receive the rings 12, 13 in the manner illustrated, and the rings 12, 13 or other rings (not shown) may be selectively positioned in the notches 14.

The training device 10 is utilized by holding the rod 11 at or just below the upper surface (not shown) of a body of water (also not shown), such as a fish tank with but a single one of the rings 12, 13 completely submerged in the water. It is presumed that the fish F can be finger fed and the rod 11 is held in one hand while fish food is held in the other. The ring 12, for example, is positioned closely adjacent the face of the fish by suitably manipulating the rod 11 in one hand while with the other hand a particle of food is held close to but at an opposite side of the ring 12 which attracts the fish and, hence, causes the fish to swim through the ring 12. The fish F may hesitate initially but will soon become adjusted to this maneuver which can be repeated until, for example, with the fish F positioned as shown in FIG. 1, food held at the right-hand side of the ring 13 will influence the fish F to swim through both the rings 12, 13. The fish thereby becomes conditioned to swim through a ring, which is again preferably distinguishable visually to the fish by being colored or otherwise, and once the fish F is trained to swim through a plurality of such rings 12, 13 positioned along the rod 11 additional and more difficult training can be accomplished. A further device for training fish or the like is fully illustrated in FIG. 2 of the drawings and is generally designated by the reference numeral 15. The training device 15 includes a tube 16 having an entrance end portion for entrance opening (unnumbered) to the left which may likewise be painted red or have a colored ring carried thereby which is visually discernible by fish F which it is assumed has been trained to pass through the colored rings 12, 13. Assuming that the entrance end portion 17 of the tube 16 is colored much as the rings 12, 13, the previously acquired conditiong of the device 10 will influence the fish into swimming toward the end portion 17 and into the tube 16 toward an opposite shoulder end portion 18 closed by a cap 19 having means in the form of a tubular element 20 which holds fish food $F_1$ and is closed by a friction cap 21 having perforations 22.

Figure 3:
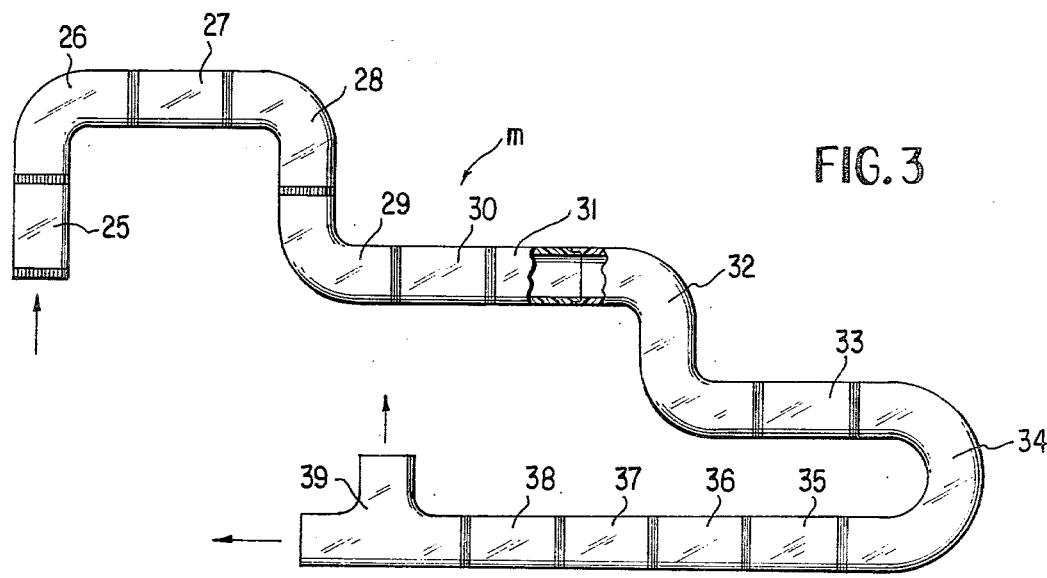
FIG. 3 is a side elevational view with a portion thereof broken away for clarity of a tubular maze and illustrates a variety of differently contoured individual tubular elements forming the maze with each element having means such as a colored ring or band which is distinguishable to a fish for leading fish into and along the maze.

Once the fish F enters the tube 16 through the earlier-mentioned conditioning and curiosity it eventaully swims through the tube 16 and is rewarded in its efforts once again by the food $F_1$ within the tubular element 20 which, of course, is accessible through the perforations 22. In this manner, the fish F is conditioned not only to swim through a relatively short tube (the rings 12 or 13)

but a more confined tube 16. Once the fish F is conditioned to swim through a confined tube, a plurality of such tubes may be interconnected by friction fits in the manner of coupling the closure 19 to the tube 16 by the shoulder 18 to form a maze M (FIG. 3). The maze M of FIG. 3 is formed of a number of elements 25 through 39 which are each tubular and each includes an entrance end portion (unnumbered) having means corresponding to the means 17 in the form of a removable ring or paint visible to a fish. Thus, a fish having been conditioned by the training associated with the tube 16 will be attracted to the entrance end portion (unnumbered) of the tube 25 by virtue of the red paint or red ring (unnumbered) associated therewith adjacent the unnumbered headed arrow and will swim into the tube or tubular element 25 and continue toward the tube 26 since he will next see the means 17 (also unnumbered in FIG. 3) associated with the entrance end portion (unnumbered) of the tube 26. In this fashion the fish will progressively swim through the tubular maze M along its entire length exiting as might be chosen through either of the arms (unnumbered) of the T-shaped tube 39. Obviously, the maze M is not constructed as that shown in FIG. 3 after the initial training of the fish F with the tube 16 but instead one or two of the tubes may be interconnected and then the maze progressively increased in complexity as the conditioning of the fish increases. For example, the maze M could be simply made of the tubular elements 25, 26 with the cap 20 secured at the exit opening (unnumbered) of the tubular element 26 to reward the fish after he has swum from the entrance opening of the tube 25 to the exit opening of the tube 26. This process is repeated by adding additional tubes 27, 28, etc. with the cap 19 secured to the exit opening of the last tube in a series to "reward" the fish once he has swum through a particular maze M.

Figure 2:
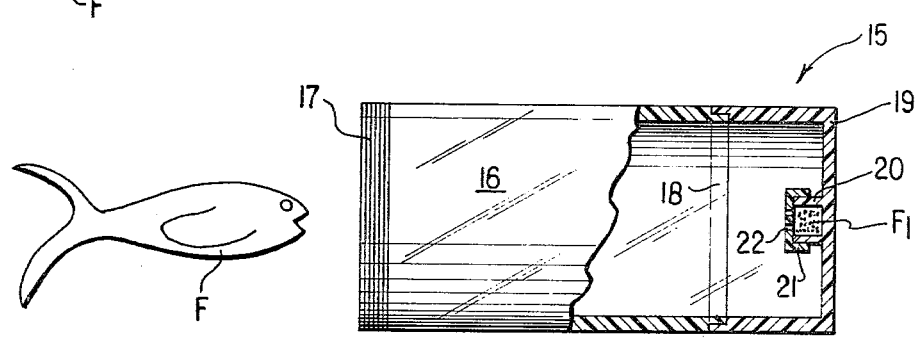
FIG. 2 is a side elevational view partially broken away for clarity, and illustrates a tube having an open end into which a fish is attracted by food carried by a removable cap at a closed end of the tube.

Reference is now made to FIGS. 4 and 5 of the drawings which fully illustrate a device 40 which simulates a horse race game except obviously utilizing fish or the like. The housing 10 is preferably constructed of generally transparent plastic material and includes opposite generally parallel side walls 41, 42, a pair of inline partioning walls 43, 44 parallel to the walls 41, 42 and having a slot 45 therebetween, a bottom wall 46, a top wall 47 having a slot 48, a bottom wall 49 having an upper edge portion 50, and a front wall 51 having generally circular entrance openings 52, 53. The entrance openings 52, 53 are painted red or a like color which define means visibly distinguishable to fish or the like for identifying and bounding the entrance openings 52, 53 much in the manner of the ring or colored portion of the tube 16 (FIG. 2). The upper edge portion 50 of the rear wall or back wall 49 likewise includes a colored band (red) which is also visible to fish. It is to be noted that the upper edge portion 50 of the rear wall 49 terminates well above the top wall 47.

A generally rectangular gate 54 includes a handle 55 and a pair of means 56, 57 corresponding to the tubular element 20 of the device 15 of FIG. 2 for holding fish or like food which are closed by respective caps 58, 59 having appropriate perforations (unnumbered) corresponding to the perforations 22 of the cap or closure 21 (FIG. 2).

The device 50 is lowered into the water of a fish tank and the gate 54 is inserted in the slot 48 in the manner shown in FIG. 5 to separate a pair of chambers 60, 61 from respective paths of travel 62, 63. The chambers 60, 61 are to the left of the gate 54 when the latter is in its closed position while the paths of travel 62, 63 are to the right of the gate 54 and extend between the latter and exit openings (unnumbered) of the housing 40 difined by the area between the upper edged portion of the rear wall 49 and the upper wall 47.

A fish which has been conditioned in the manner heretofore described will be attracted by the color of the entrance openings 52, 53 and the food (not shown) within the tubular elements 56, 57 and will thus enter into the chambers 60, 61. Assuming a fish has entered each of the chambers 60, 61 and each fish is eating food adjacent the closures 58, 59, the gate 54 is then lifted vertically upwardly (FIG. 4) at which point upon the removal of the food the fish will, due to the earlier-mentioned conditioning, swim toward the red upper edge portion of the housing 40 and, of course, the first fish exiting either of the paths of travel 62, 63 thereby crossing the "finish line" 50 is the winner of the "fish race." The slots 45, 48 are illustrated exaggerated in size and are slightly larger than the thickness of the gate 54 so that once the fish have entered through the entrance openings 52, 53 into the respective chambers 60, 61 they necessarily will swim toward the rear wall 49 and exit through the openings (unnumbered) thereabove.

A final device 65, FIG. 6, forming a part of the kit of this invention is designed to play the game tic-tac-toe by utilizing one or more fish and includes a sheet or board 66 of a generally rectangular configuration having secured to a rear surface (unnumbered) thereof a pair of tubular fittings 67, 68 through which the rod 11 can be passed to support the device 65 within an aquarium or the like. The sheet or board 66 has means in the form of red or similar paint which is visible to fish and is generally designated by the reference numeral 70. The means 70 defines or sets off a plurality of generally rectangular areas 71–79 each of which includes identical means (unnumbered) in the form of a plurality of tubular elements corresponding to the tubular element 20 of the device 5. Initially all nine of the tubular elements associated with the area 71–79 are closed by perforated caps corresponding to the closure 21 after, of course, fish or like food has been inserted thereinto. Assuming that the board 66 is in a fish aquarium with the closures 21' all in place on all nine of the fish food holding means, eventually a fish will swim toward and feed at the food holding means of one of the areas 71 through 79. The perforated cap 21' of that particular area is removed and replaced by a cap 80 having an "O" thereon or a cap 81 having a "X" thereon. A fish may now feed at all but the capped area and when a fish feeds next in one of the reamining areas, the next contestant removes the perforated cap 21' therefrom and replaces same by one of the caps 81. The play continues in an alternate fashion until three of the "O's" or three of the "X's" are in linear alignment indicating a winner, and if no winner the game is replayed.

Although only a preferred embodiment of the invention has been specifically illustrated and described herein, it is to be understood that minor variations may be made in the apparatus or in the method of without departing from the spirit and scope of the invention, as defined in the appended claims.

I claim:

1. A kit for training and observing fish or the like, the kit including an elongated notched rod and a plurality of rings adapted to be adjustably positioned therealong, a plurality of tubs adapted to be interconnected to form a maze, a housing including means defining two paths of travel having opposite entrance and exit openings and a movable gate carrying fish or like food holding means and being adapted for movement between open and closed positions, and a sheet having means setting off a plurality of individual areas with fish or like food holding means within each area.

2. The kit as defined in claim 1 including a plurality of two differently marked means for selective application to said last-mentioned holding means to prevent food from attracting fish or the like thereto.

3. The device as defined in claim 1 including means visibly distinguishable to a fish for identifying and bounding an entrance opening associated with at least one of said rings, tubes, and housing.

* * * * *